(12) United States Patent
O'Doherty

(10) Patent No.: US 11,319,073 B2
(45) Date of Patent: May 3, 2022

(54) APPARATUS FOR CREATING A SLEEPING SURFACE

(71) Applicant: Michelle O'Doherty, Nanuet, NY (US)

(72) Inventor: Michelle O'Doherty, Nanuet, NY (US)

( * ) Notice: Subject to any disclaimer, the term of this patent is extended or adjusted under 35 U.S.C. 154(b) by 0 days.

(21) Appl. No.: 15/252,968

(22) Filed: Aug. 31, 2016

(65) Prior Publication Data

US 2018/0055239 A1    Mar. 1, 2018

(51) Int. Cl.
| | | |
|---|---|---|
| B64D 11/06 | (2006.01) | |
| A47D 7/04 | (2006.01) | |
| B64D 11/00 | (2006.01) | |
| A47C 27/16 | (2006.01) | |
| A47C 23/00 | (2006.01) | |
| A61G 7/10 | (2006.01) | |

(52) U.S. Cl.
CPC ............ *B64D 11/0641* (2014.12); *A47D 7/04* (2013.01); *B64D 11/0612* (2014.12); *A47C 23/007* (2013.01); *A47C 27/16* (2013.01); *A61G 7/103* (2013.01); *B64D 2011/0092* (2013.01)

(58) Field of Classification Search
CPC ..... A47C 27/081; A47C 27/122; A47C 27/16; A47C 23/007; B64D 11/0641; B64D 11/0612; B64D 2011/0092; A61G 7/103; A61G 7/1011; A61G 7/1026; A61G 7/0504; A61G 7/04; A61G 1/01; A61G 1/013; A61G 1/044; A61G 1/048
See application file for complete search history.

(56) References Cited

U.S. PATENT DOCUMENTS

| | | | | | |
|---|---|---|---|---|---|
| 2,648,072 | A | * | 8/1953 | De Blieux | B60N 2/345 296/63 |
| 2,676,337 | A | * | 4/1954 | Soeder | B60N 2/2854 5/655 |
| 2,711,545 | A | * | 6/1955 | Moore | B60N 2/345 5/118 |
| 3,063,064 | A | * | 11/1962 | Mace | A47B 3/12 108/166 |
| 3,648,306 | A | * | 3/1972 | Auerbach | A47C 17/80 280/751 |
| 3,798,686 | A | * | 3/1974 | Gaiser | A47C 27/084 5/413 AM |
| 3,833,947 | A | * | 9/1974 | Sorensen | B60N 2/2854 5/94 |

(Continued)

FOREIGN PATENT DOCUMENTS

| | | |
|---|---|---|
| CN | 201571778 U | 9/2010 |
| CN | 202005503 U | 10/2011 |

(Continued)

OTHER PUBLICATIONS

Merriam Webster Dictionary, Apr. 23, 2009, https://web.archive.org/web/20090423132116/http://www.merriam-webster.com/dictionary/grommet.*

*Primary Examiner* — Peter M. Cuomo
*Assistant Examiner* — Morgan J McClure
(74) *Attorney, Agent, or Firm* — Patent Law Clinic, New York Law School

(57) ABSTRACT

A sleeping apparatus comprising a textile fiber shell, a plurality of adjustable straps coupled to the textile fiber shell and a plurality of anchors, wherein each anchor is coupled to one of the plurality of adjustable straps, wherein the anchors are configured to attach to one or more structures such that the textile fiber shell forms a flat sleeping surface.

19 Claims, 4 Drawing Sheets

(56) References Cited

U.S. PATENT DOCUMENTS

| | | | | |
|---|---|---|---|---|
| 4,796,903 | A * | 1/1989 | Proctor | A47D 13/04 |
| | | | | 280/32.5 |
| 5,487,361 | A * | 1/1996 | Dean | A01K 1/0272 |
| | | | | 119/28.5 |
| 5,860,174 | A * | 1/1999 | Failor | A61G 7/103 |
| | | | | 5/703 |
| 6,796,606 | B2 * | 9/2004 | Marshall | B60N 2/28 |
| | | | | 297/182 |
| 7,263,730 | B2 | 9/2007 | Crawford | |
| 7,328,472 | B2 * | 2/2008 | Chaffee | A47C 7/021 |
| | | | | 5/655.3 |
| D588,755 | S * | 3/2009 | Farrell | D30/118 |
| 9,572,439 | B2 * | 2/2017 | Pitchforth | A47G 9/086 |
| 2006/0150922 | A1 * | 7/2006 | Kroculick | A01K 1/0272 |
| | | | | 119/771 |
| 2015/0143632 | A1 * | 5/2015 | Obrentz | A47G 9/062 |
| | | | | 5/417 |

FOREIGN PATENT DOCUMENTS

| | | | | |
|---|---|---|---|---|
| DE | 19937231 | A1 | 1/2001 | |
| DE | 102009016496 | B4 | 6/2013 | |
| GB | 2444700 | * | 12/2006 | B60N 2/34 |
| WO | 2015/187033 | A1 | 10/2015 | |

* cited by examiner

APPARATUS FOR CREATING A SLEEPING SURFACE

BACKGROUND INFORMATION

Traditionally, airline seats are not adjustable enough to provide a comfortable sleeping surface for children, which causes great inconvenience for adults traveling with children. Parents usually aim to schedule flights when their children are tired hoping their children will sleep through most of the flight. However, children are often uncomfortable in airplanes and cannot sleep, which is worse when they are tired. Children may become very irritable and restless, which often disturbs other passengers, and creates a miserable experience for adults traveling with children.

SUMMARY

Described herein is a sleeping apparatus having a textile fiber shell, a plurality of adjustable straps coupled to the textile fiber shell, and a plurality of anchors, wherein each anchor is coupled to one of the plurality of adjustable straps, wherein the anchors are configured to attach to one or more structures such that the textile fiber shell forms a flat sleeping surface.

Also described is a sleeping apparatus having a textile shell comprising an inner chamber, a deformable material configured to be inserted into the inner chamber, a first plurality of straps coupled to the textile fiber shell and including an anchor coupled to each strap, the anchor being configured to secure the sleeping apparatus to a structure and a second plurality of straps coupled to the textile shell and configured to secure a user to the textile fiber shell.

Further described herein is a sleeping apparatus having a textile shell, a means for attaching the textile shell to a first structure, a means for attaching the textile shell to a second structure and a means for securing a user to the textile shell.

DETAILED DESCRIPTION

Figure 1:
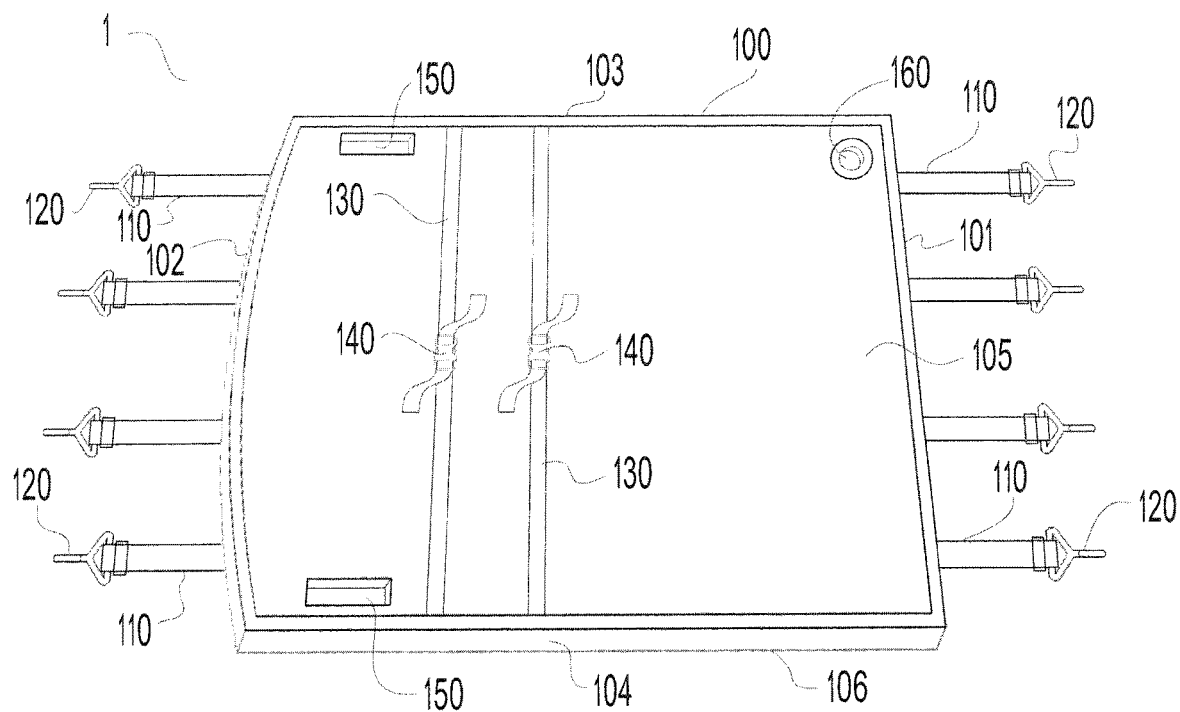
FIG. 1 shows a top view of an exemplary embodiment of a sleeping apparatus for creating a sleeping surface.

The exemplary embodiments may be further understood with reference to the following description and the appended drawings, wherein like elements are referred to with the same reference numerals. The exemplary embodiments describe a device, which provides a child with a bed to sleep in on an airplane.

As will be described in greater detail below, the exemplary device may provide a child with a safe and comfortable surface to sleep on in an airplane seat. Specifically, by providing a convenient and travel-friendly material that connects between airplane seats, any seat may be transformed into a sleeping surface. Accordingly, the device described herein may increase ease and comfort of travel for children and their guardians.

FIG. 1 shows a top view of an exemplary embodiment of a sleeping apparatus 1. The sleeping apparatus 1 may be comprised of an outer textile fiber shell 100 that may be constructed of any type of material. Exemplary materials include cotton, canvas, nylon, rayon, or any other flexible and washable or water-proof fabric. The outer textile fiber shell 100 is generally rectangular, having two substantially parallel first sides 101, 102 and two substantially parallel second sides 103, 104. However, it should be understood that any shape that can fit within the dimensions of an airplane seat are acceptable, as will be discussed in greater detail below. The outer textile fiber shell 100 also has a top surface 105 and a bottom surface 106. The bottom surface 106 will be shown in greater detail in later figures. As illustrated in the FIG. 1, when deployed, the outer textile fiber shell 100 will have a depth because as will be described in greater detail below, the outer textile fiber shell 100 has an inner chamber that may include a deformable material that provides a cushion for the child the sleep on. Thus, when this deformable material is placed within the inner chamber of the outer textile fiber shell 100 the sleeping apparatus 1 will also have a depth (e.g., the top surface 105 will be separated from the bottom surface 106).

Attached, either permanently sewn, or by detachable means such as buttons, to the first sides 101, 102 of the outer textile fiber shell 100 may be a plurality of adjustable straps 110. In one example, the adjustable straps 110 are constructed of a flexible material such as a bungee cord. In another example, the adjustable straps 110 are not flexible (e.g., are constructed from nylon), but include a mechanism such as a strap buckle that allows the length of the adjustable straps 110 to be adjusted. Each of the adjustable straps 110 may be coupled to anchors 120 that latch the sleeping apparatus 1 to the corresponding airplane seats, as will be discussed in greater detail below.

Figure 2:
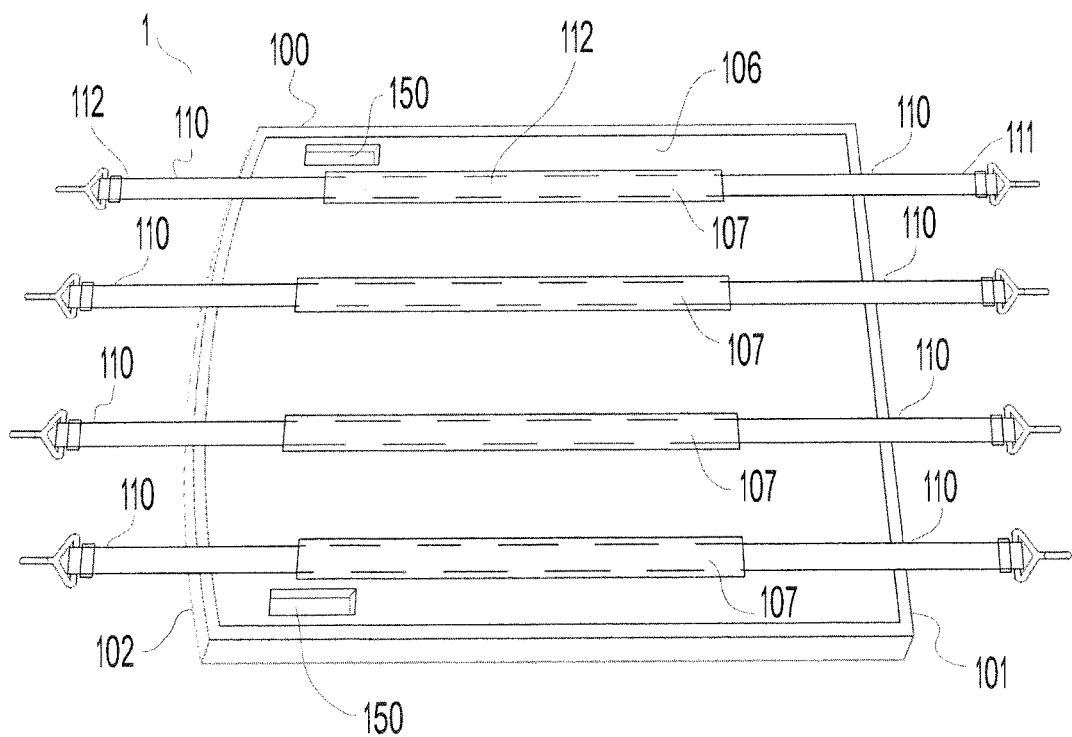
FIG. 2 shows a bottom view of an exemplary embodiment of the sleeping apparatus for creating a sleeping surface.

In an alternative embodiment, the adjustable straps 110 may run the entire length of the outer textile shell 100. This embodiment is shown in FIG. 2 that shows a bottom view of an exemplary embodiment of an apparatus for creating a sleeping surface. For example, a first end 111 of the adjustable strap 110 may extend from a first one of the first sides 101 and a second end 112 of the same adjustable strap 110 may extend from a second one of the first sides 102. In such an embodiment, a length 112 of the adjustable strap 110 between the first end 111 and the second end 112 may be secured to the outer textile shell 100 in any number of manners. In one example shown in FIG. 2, the bottom surface 106 of the outer textile shell 100 may have a series of channels 107 through which the adjustable straps 110 may run. The channels 107 may be additional textile material that is attached (e.g., sewn onto) the bottom surface 106 of the outer textile shell 100.

In the embodiment shown in FIG. 1, there are two adjustable straps 110 that extend from each of the first sides 101, 102. In the embodiment shown in FIG. 2, there are three adjustable straps 110 that extend from each of the first sides 101, 102. From these two examples, it should be understood that any number of adjustable straps 110 may be used to secure the sleeping apparatus 1 to the airplane seat. In another example, the sleeping apparatus 1 may have four adjustable straps 110 that extend from each of the first sides 101, 102.

Returning to FIG. 1, attached, either permanently sewn, or by detachable means such as buttons, to the second sides 103, 104 of the sleeping apparatus 1 may be one or more security straps 130. The security straps 130 may be used to safely harness the child into the sleeping apparatus 1 by clasping together with strap joining fasteners 140. Two security straps 130 are shown in the exemplary embodiment, however any number of security straps 130 may be used to safely secure the child. Those skilled in the art will understand that laws and/or regulations require an airline passenger to be safely secured to their seat during various phases of the flight (e.g., takeoff, landing, during heavy turbulence, etc.). In addition, most airlines also recommend that passengers who are not moving about the cabin remain safely secured to their seat in case of an unexpected event. While the exemplary embodiments of the sleeping apparatus 1 are described as providing a comfortable sleep area for the child, the safety of the child is of paramount importance and the security straps 130 are provided to safely secure the child to the sleeping apparatus 1. It should be recognized that while the security straps 130 secure the child to the sleeping apparatus 1, the sleeping apparatus 1 must also be secured to the airplane seat. The method of securing the sleeping apparatus 1 to the airplane seat will be described in greater detail below.

In addition, on the second sides 103, 104 of the outer textile fabric shell 100 may be openings 150 that may allow the pass through of the airplane's seatbelt. As shown by FIGS. 1 and 2, the openings 150 provide a pass through from the lower surface 106 to the upper surface 105. The openings 150 provide the user with an option to further secure the child with the seatbelt of the airplane seat. For example, the parent may bring the airplane seatbelt through the openings 150 in the bottom surface 106 and through to exit through the openings 150 in the top surface 105 such that the airplane seatbelt may then be buckled on top of the sleeping apparatus 1 to secure the child. In addition, this feature allows use of the sleeping apparatus 1 without hindering the use of the seatbelt in order to abide by airline and government safety rules. This exemplary embodiment also allows the flight attendant to see that the airplane seatbelt is buckled.

Figure 3:
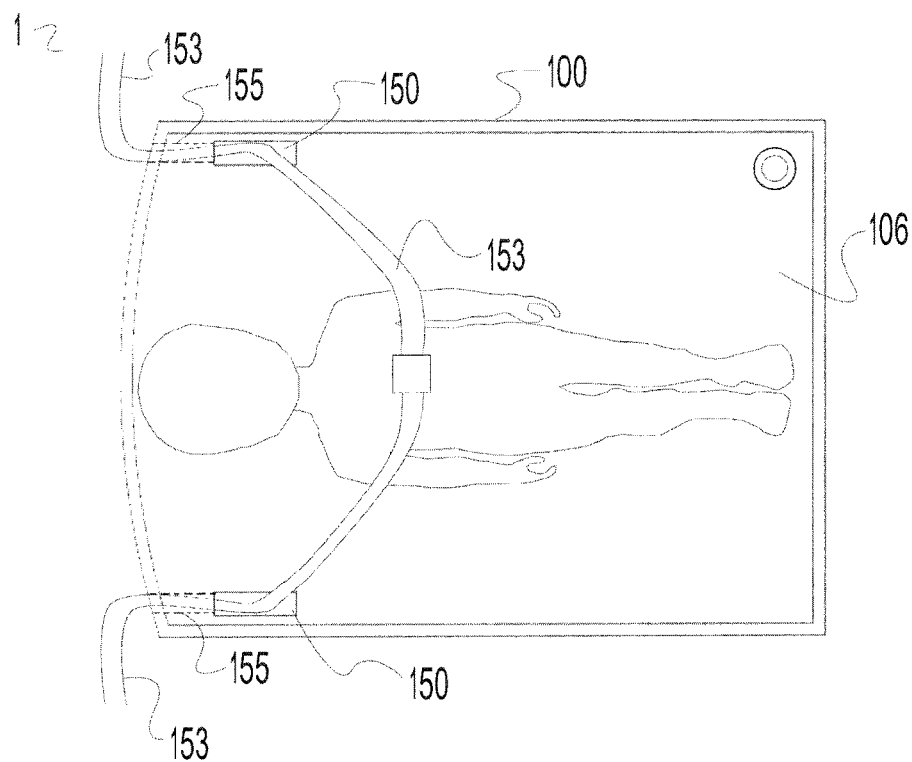
FIG. 3 shows a second bottom view of an exemplary embodiment of the sleeping apparatus for creating a sleeping surface.

FIG. 3 shows a second bottom view of an exemplary embodiment of an apparatus 1 for creating a sleeping surface. As described above, either the child or the sleeping apparatus 1 should also be secured to the airplane seatbelt. In addition, the airplane seatbelt should be prevented from shifting to an unsafe position on the child. For example, the airplane seatbelt 153 should be secured across the lap of the child and should remain in place so that it does not fall off of the child or move to the head area or the leg area which may not safely secure the child during flight. In the example of FIG. 3, a seatbelt securing mechanism 155 may be used to hold the seatbelt in a safe position. The exemplary embodiment shows a seatbelt securing mechanism 155 that redirects part of the airplane seatbelt 153 on the lower surface 106 of the sleeping apparatus 1 in order to hold the seatbelt 153 in the proper position on the child's body. The seatbelt securing mechanism 155 may secure the seatbelt by directing the airplane seatbelt 153 through the seatbelt securing mechanism 155 to the openings 150 that are placed in the sleeping apparatus 1 in the area of the waist of the child. Thus, when the airplane seatbelt 153 is pulled through the openings 150, the airplane seatbelt 153 may then be secured across the child's waist area as shown in FIG. 3. The seatbelt securing mechanism 155 may be, for example, a channel that is formed by sewing a piece of textile fabric to the bottom surface 106 of the sleeping apparatus 1 in the same manner as described above for the channels 107 shown in FIG. 2. In another example, the seatbelt securing mechanism 155 may be a plastic channel that is secured to the bottom surface 106 to provide a rigid channel through which the airplane seatbelt 153 may run. It should be noted that the exemplary embodiments of the bottom surface 106 shown in FIGS. 2 and 3 are not exclusive. For example, both the channels 107 and the seatbelt securing mechanism 155 may be implemented in an embodiment of the sleeping apparatus 1.

It should also be noted that the example of the openings 150 running through to the top surface 105 of the sleeping apparatus 1 is also only exemplary. For example, the openings 150 may also stop in the inner chamber (described in greater detail below) such that the airplane seatbelt may be buckled within the inner chamber of the sleeping apparatus 1, rather than over the top surface 105 of the sleeping apparatus 1.

Figure 5:
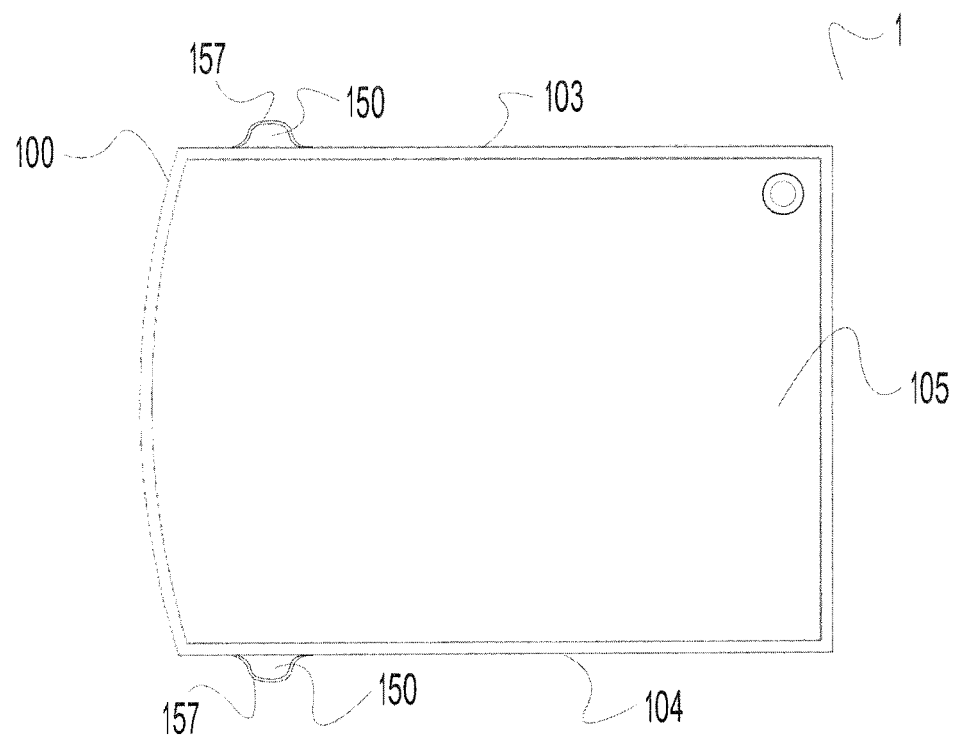
FIG. 5 shows a top view of an alternative embodiment of the sleeping apparatus.

It should also be noted that the openings 150 are not required to be within the body of the outer textile shell 100. For example, FIG. 5 shows a top view of an alternative embodiment of the sleeping apparatus 1. In this exemplary embodiment, the openings 150 are created by the addition of wings 157 that are attached to each of the second sides 103, 104. The openings 150 in the wings 157 may serve the same purpose as described above, e.g., the airplane seatbelt may be threaded through the openings 150 to secure the sleeping apparatus 1 or the child to the airplane seat. The wings 157 may be constructed of any type of material. In one example, the wings 157 may be the same material as the outer textile shell 100 and may be attached by sewing the wings 157 to the outer textile shell 100. In another example, the wings 157 may be a material such as plastic that is attached to the outer textile shell 100.

Returning to FIG. 1, embedded into the upper surface 105 of the outer textile fiber shell 100 may be a grommeted circular aperture 160 for access to materials within the outer textile fiber shell 100, such as various materials to provide more comfort to the sleeping apparatus 1 such as inflatable devices, pillow stuffing or any other such material, as will be discussed in greater detail below. One material is shown in the exemplary embodiment, however, any such material such that would add comfort to a child laying on the sleeping apparatus 1 are acceptable. It is noted that the grommeted circular aperture 160 being located in the top surface 105 is only exemplary. The grommeted circular aperture 160 may also be located on the bottom surface 106 or any of the first sides 101, 102 or second sides 103, 104. In addition, the grommeted circular aperture 160 does not need to be circular or include a grommet. The aperture may take on any shape and the grommet is merely included to strengthen the outer textile fiber shell 100 in the area of the aperture 160, but is not required.

Figure 4:
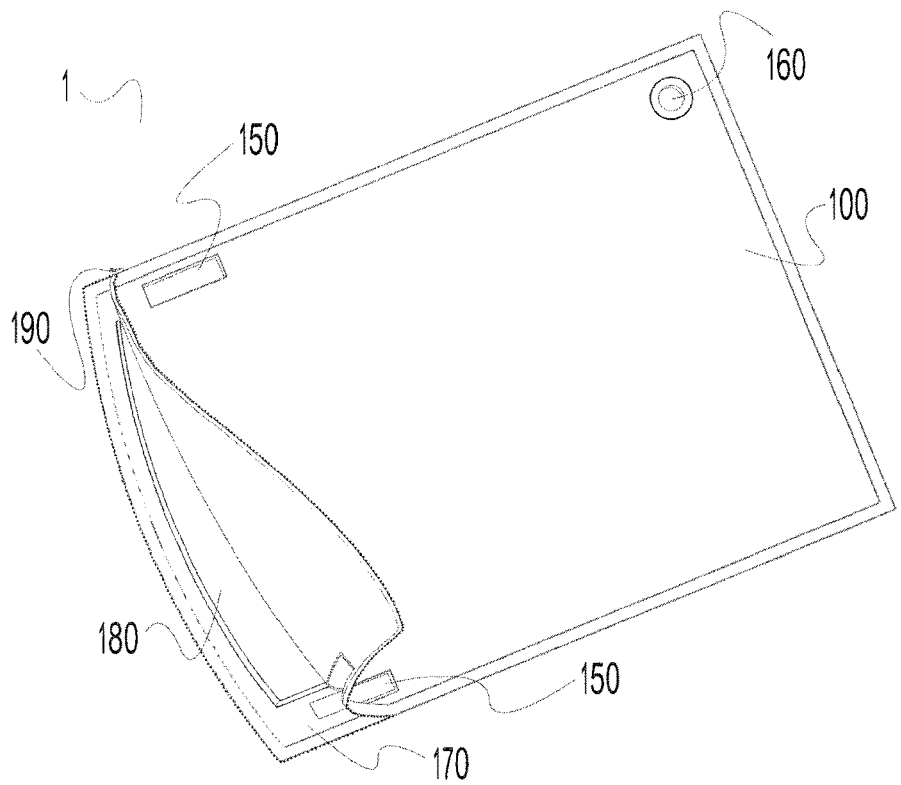
FIG. 4 shows an open view of the outer textile fiber shell of the sleeping apparatus including a more detailed view of the inner chamber and an exemplary deformable material housed within.

FIG. 4 shows an open view of the outer textile fiber shell 100 of the sleeping apparatus 1 including a more detailed view of the inner chamber and an exemplary deformable material housed within. Within the outer textile fiber shell 100 may be one or a multitude of inner chambers 170. Inside the inner chambers 170 may be a deformable material 180 used for sleeping on that may be enclosed within the outer textile fiber shell 100 by a shell enclosing device 190 such as a zipper, toggles, buttons, or any other such device. A zipper is shown in the exemplary embodiment, but any such device such that would enclose the deformable material 180 within the inner chambers 170 is acceptable.

The exemplary deformable material 180 may be used to increase the comfort of the sleeping apparatus 1. In this exemplary embodiment, the deformable material 180 may be an inflatable device such as a plastic bladder that may be inflated for use and deflated for storage. In such an embodiment, the deformable material 180 may have an inflation nozzle that may be aligned with the grommeted circular aperture 160 for easy access to the user for inflation or inflation adjustment.

Figure 6:
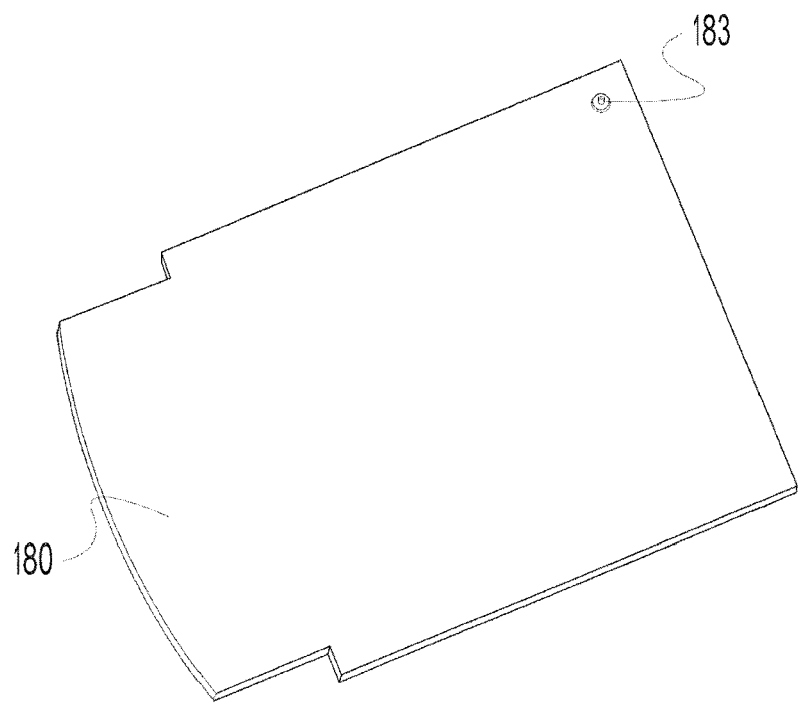
FIG. 6 illustrates the deformable material if removed from the inner chamber.

FIG. 6 illustrates the deformable material 180 if removed from the inner chamber 170. In the exemplary embodiment of an inflatable deformable material 180 there may be an inflation nozzle 183, wherein the inflation nozzle 183 would coincide with the placement of the grommeted circular aperture 160 as seen in FIG. 4 for easy access by the user for inflation or inflation adjustment. The deformable material 180 may be removable, like in the exemplary embodiment, or permanently housed with the inner chamber 170, for example as pillow stuffing or a non-removable inflatable material permanently attached to the inside of the outer textile fiber shell 100, or any other water-resistant or washable material. This provides the user with a sleeping apparatus 1 that is easy to travel with but may still provide a comfortable sleeping surface for a child.

From these examples, it should be seen that the deformable material 180 is not required to be an inflatable material, but may be any material such that it can be rolled or flexible. In this manner, the sleeping apparatus 1 may be rolled up or folded for convenience of travel. In the case where the deformable material 180 is not inflatable, the grommeted circular aperture 160 may not be provided because the user would not need access to the inflation nozzle 183.

Figure 7:
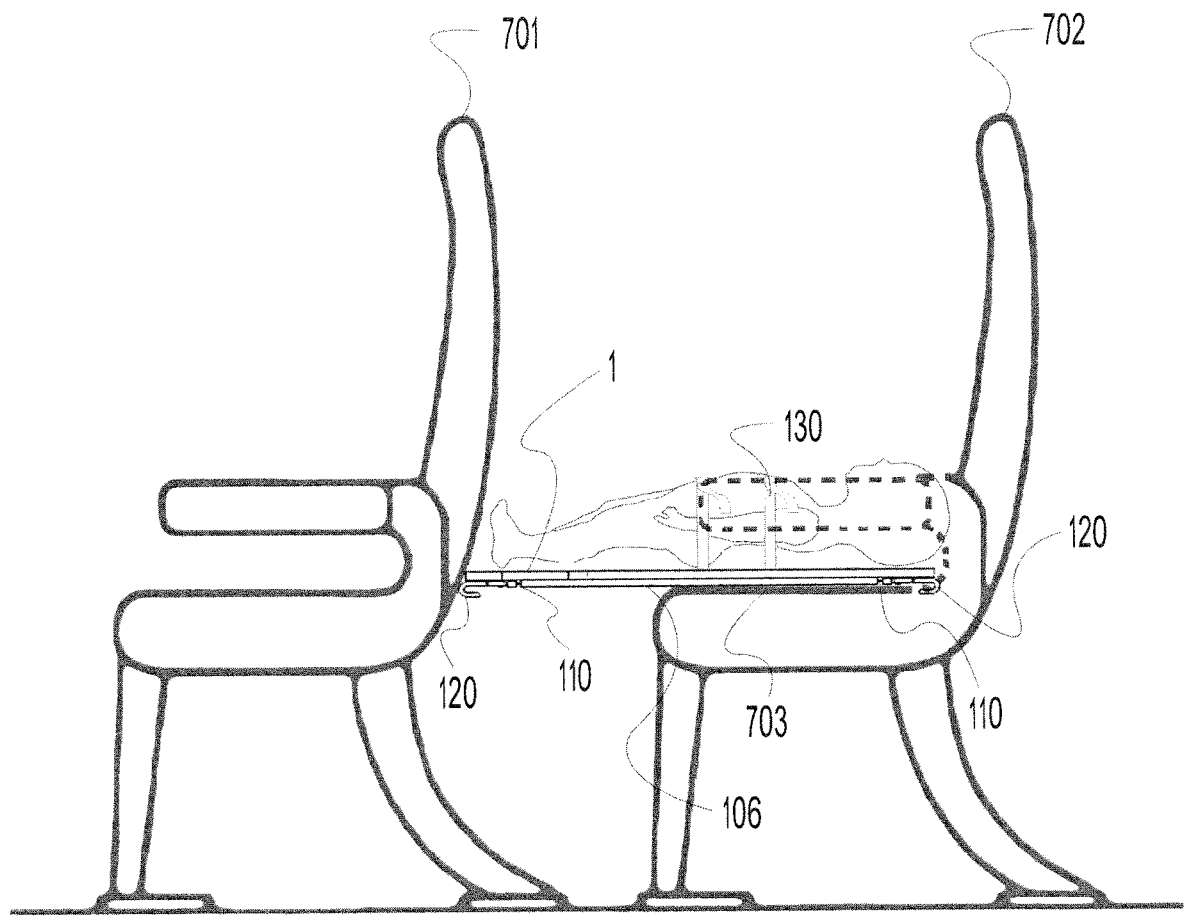
FIG. 7 shows a schematic of the sleeping apparatus being used on an airplane.

FIG. 7 shows a schematic of the sleeping apparatus 1 as seen in FIG. 1 being used on an airplane. The sleeping apparatus 1 may span the area of the user's airplane seat 702 and the seat in front 701 by securing the sleeping apparatus 1 using the adjustable straps 110 and anchors 120. The anchors 120 of the feet side of the sleeping apparatus 1 may attach to the airplane seat in front 701 in any number of places, such as, the tray, the pocket, the armrest, or any other various attachment site. Additionally, the anchors 120 at the head side of sleeping apparatus 1 may attach to the airplane seat 702 of the user at the armrest, seatbelt buckle or other various attachment sites. As can be seen in this example, a child is laying on the sleeping apparatus 1 and is secured to the sleeping apparatus 1 by the security strap 130. As detailed above, the sleeping apparatus 1 or the child may also be further secured by the seatbelt of the airplane seat 702 in any one of the manners described above. In this example, the bottom surface 106 of the sleeping apparatus 1 contacts the seating surface 703 of the airplane seat 702. However, this is only exemplary, as the sleeping apparatus 1 (when properly connected) may also be suspended above the seating surface 703 of the airplane seat 702.

In addition, although the exemplary embodiment indicates the head of the child is on the airplane seat 702 and the feet of the child are over the suspended portion in the leg area of the seating arrangement, the sleeping apparatus 1 may be symmetrical about the foot and head position allowing the user to position the child in either direction, contingent upon airline rules.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A sleeping apparatus comprising:
    a textile fiber shell comprising an upper sleeping surface and a lower support surface, wherein the textile fiber shell comprises a rectangular shape having a first set of substantially parallel sides and a second set of substantially parallel sides, wherein the first set of sides are longer than the second set of sides;
    a plurality of adjustable straps coupled to the lower support surface of the textile fiber shell, wherein each of the plurality of adjustable straps is coupled to the lower support surface via a corresponding channel formed on the lower support surface for each of the plurality of straps, wherein each of the channels is parallel to the first set of sides and perpendicular to the second set of sides and wherein at least one of the channels is formed on the lower support surface between the first set of sides; and
    a plurality of anchors, wherein each anchor is coupled to one of the plurality of adjustable straps, wherein the anchors are configured to attach to one or more structures to support the lower surface of the textile fiber shell relative to the one or more structures such that the upper sleeping surface is a flat surface.

2. The sleeping apparatus of claim 1, wherein the textile fiber shell is one of cotton, canvas, nylon, or rayon.

3. The sleeping apparatus of claim 1, wherein the adjustable straps are one of flexible or non-flexible.

4. The sleeping apparatus of claim 1, further comprising: strap buckles coupled to the adjustable straps.

5. The sleeping apparatus of claim 1, wherein the textile fiber shell includes at least two openings, wherein each opening has a first end at the lower support surface and a second end at the upper sleeping surface, each opening allows for a pass-through of one of a first end or a second end of a seatbelt of an airplane seat.

6. The sleeping apparatus of claim 5, wherein the lower support surface further comprises:
    a seatbelt securing mechanism comprising at least two seatbelt channels formed on the lower support surface, each seatbelt channel comprising a first end and a second end, wherein the first end of one of the seatbelt channels is located adjacent to the first end of one of the openings and the second end of the one of the seatbelt channels is located a predetermined distance from the first end of the one of the openings, wherein the seatbelt channels secure the one of the first end or second end of the seatbelt to the sleeping apparatus and guide the one of the first end or the second end of the seatbelt to the openings.

7. The sleeping apparatus of claim 1, further comprising:
    a releasable security strap coupled to the textile fiber shell and including a strap joining fastener to secure a person to the sleeping apparatus.

8. The sleeping apparatus of claim 1, wherein the textile fiber shell further comprises an inner chamber configured to receive support material to support the upper sleeping surface, wherein the inner chamber is accessible from a shell enclosing device.

9. The sleeping apparatus of claim 8, wherein the support material comprises a deformable material housed within the inner chamber.

10. The sleeping apparatus of claim 9, wherein the deformable material is one of an inflatable object, a foam material or a cotton material.

11. The sleeping apparatus of claim 8, wherein the shell enclosing device is one of a zipper, toggles, or buttons.

12. The sleeping apparatus of claim 1, wherein a surface of the textile fiber shell includes a grommeted circular aperture for access to the deformable material housed within the inner chamber.

13. The sleeping apparatus of claim 1, wherein the textile fabric shell has a width of a single airplane seat.

14. The sleeping apparatus of claim 1, wherein each of the channels is formed by attaching additional textile material to the lower support surface.

15. A sleeping apparatus, comprising:
- a textile shell comprising an upper sleeping surface, a lower support surface and an inner chamber, wherein the textile shell comprises a rectangular shape having a first set of substantially parallel sides and a second set of substantially parallel sides, wherein the first set of sides are longer than the second set of sides;
- a deformable material configured to be inserted into the inner chamber to support the upper sleeping surface relative to the lower support surface;
- a first plurality of straps coupled to the lower support surface of the textile fiber shell and including an anchor coupled to each strap, the anchor being configured to secure the sleeping apparatus to a structure, wherein each of the plurality of adjustable straps is coupled to the lower support surface via a corresponding channel formed on the lower support surface for each of the plurality of straps, wherein each of the channels is parallel to the first set of sides and perpendicular to the second set of sides and wherein at least one of the channels is formed on the lower support surface between the first set of sides; and
- a second plurality of straps coupled to the textile shell and configured to secure a user to the textile fiber shell.

16. The sleeping apparatus of claim 15, wherein the deformable material is an inflatable object comprising an inflation nozzle.

17. The sleeping apparatus of claim 16, wherein the textile shell comprises an aperture configured to align with the inflation nozzle of the deformable material such that a user can access the inflation nozzle through the aperture when the deformable material is inserted into the inner chamber.

18. The sleeping apparatus of claim 15, wherein the textile shell further comprises openings through which a seat belt of an airplane seat may be inserted to secure the sleeping apparatus to the airplane seat.

19. The sleeping apparatus of claim 18, wherein the openings are formed by wings coupled to the textile shell.

* * * * *